US011506499B2

(12) United States Patent
Ivanov et al.

(10) Patent No.: US 11,506,499 B2
(45) Date of Patent: Nov. 22, 2022

(54) DETERMINING OF ABSOLUTE ALTITUDES OF FLOORS OF A STRUCTURE

(71) Applicant: HERE Global B.V., Eindhoven (NL)

(72) Inventors: Pavel Ivanov, Tampere (FI); Henri Jaakko Julius Nurminen, Tampere (FI); Lauri Aarne Johannes Wirola, Tampere (FI)

(73) Assignee: HERE Global B.V., Eindhoven (NL)

( * ) Notice: Subject to any disclaimer, the term of this patent is extended or adjusted under 35 U.S.C. 154(b) by 361 days.

(21) Appl. No.: 16/782,134

(22) Filed: Feb. 5, 2020

(65) Prior Publication Data
US 2020/0249026 A1 Aug. 6, 2020

(30) Foreign Application Priority Data
Feb. 5, 2019 (EP) .................................. 19155424

(51) Int. Cl.
*G01C 21/20* (2006.01)
*H04W 4/33* (2018.01)
(Continued)

(52) U.S. Cl.
CPC .......... *G01C 21/206* (2013.01); *G01S 5/0263* (2013.01); *G01S 5/14* (2013.01);
(Continued)

(58) Field of Classification Search
None
See application file for complete search history.

(56) References Cited

U.S. PATENT DOCUMENTS

| 6,999,780 B1* | 2/2006 | Zhao ..................... H04W 64/00 701/515 |
| 8,320,939 B1* | 11/2012 | Vincent ................ G01S 5/0027 709/224 |

(Continued)

FOREIGN PATENT DOCUMENTS

| CN | 104718462 A | * | 6/2015 | ........... G01C 21/206 |
| CN | 107402008 A | * | 11/2017 | ............. G01C 21/20 |

(Continued)

OTHER PUBLICATIONS

English translation of JP-2016148519-A (Year: 2016).*
Extended European Search Report for Application No. 19155424.5 dated Aug. 21, 2019, 8 pages.

*Primary Examiner* — Gennadiy Tsvey
(74) *Attorney, Agent, or Firm* — Alston & Bird LLP

(57) ABSTRACT

A method, apparatus and computer readable storage medium are provided for determining absolute altitudes of individual floors represented by an indoor map. In the context of a method, location data is obtained representing at least one track of one or more users at least partially in a structure. The location data includes horizontal and vertical location information with the vertical location information representing an absolute altitude. The method also includes obtaining indoor map data representing different floors and indicating structural elements on the floors and determining track sections of the at least one track represented by the location data such that each track section can be assumed to be on a single floor. The method further includes at least partially comparing determined track sections with floors represented by the indoor map data and determining an absolute altitude of at least some of the floors represented by the indoor map data.

19 Claims, 6 Drawing Sheets

(51) Int. Cl.
*H04W 4/80* (2018.01)
*G01S 5/02* (2010.01)
*G01S 5/14* (2006.01)
*H04W 64/00* (2009.01)

(52) U.S. Cl.
CPC ............. *H04W 4/33* (2018.02); *H04W 4/80* (2018.02); *H04W 64/006* (2013.01)

(56) References Cited

U.S. PATENT DOCUMENTS

| | | | |
|---|---|---|---|
| 9,052,999 B1 * | 6/2015 | Ray | H04W 4/90 |
| 9,057,606 B2 * | 6/2015 | Wolf | G01S 19/46 |
| 9,326,105 B2 | 4/2016 | Pattabiraman et al. | |
| 9,465,816 B2 * | 10/2016 | Johnson | G06F 16/9535 |
| 9,510,154 B2 * | 11/2016 | Mori | G01C 21/206 |
| 10,375,517 B2 * | 8/2019 | Shen | G01S 11/06 |
| 10,466,056 B2 * | 11/2019 | Jiang | G01C 21/383 |
| 2004/0066329 A1 * | 4/2004 | Zeitfuss | G01S 5/0018 |
| | | | 342/462 |
| 2013/0122935 A1 * | 5/2013 | Das | H04W 4/024 |
| | | | 455/456.6 |
| 2013/0166195 A1 | 6/2013 | Bandyopadhyay et al. | |
| 2013/0166198 A1 | 6/2013 | Funk et al. | |
| 2013/0297198 A1 | 11/2013 | Vande Velde et al. | |
| 2014/0274151 A1 * | 9/2014 | Pattabiraman | H04W 64/00 |
| | | | 455/456.3 |
| 2015/0119087 A1 * | 4/2015 | Lee | H04W 4/33 |
| | | | 455/457 |
| 2015/0168538 A1 * | 6/2015 | Bradley | G01S 5/18 |
| | | | 367/127 |
| 2015/0249907 A1 * | 9/2015 | Gupta | H04W 4/33 |
| | | | 455/456.1 |
| 2015/0264536 A1 * | 9/2015 | Patil | H04W 4/33 |
| | | | 455/456.1 |
| 2016/0161592 A1 | 6/2016 | Wirola et al. | |
| 2017/0184405 A1 | 6/2017 | Rachuri et al. | |
| 2018/0328753 A1 * | 11/2018 | Stenning | G01C 21/3676 |
| 2019/0025062 A1 * | 1/2019 | Young | G01C 21/206 |

FOREIGN PATENT DOCUMENTS

| | | | | |
|---|---|---|---|---|
| EP | 1150100 B1 * | 6/2007 | | G01C 21/20 |
| GB | 2578652 A * | 5/2020 | | G01C 21/206 |
| JP | 2013156702 A * | 8/2013 | | G06F 3/1204 |
| JP | 2016148519 A * | 8/2016 | | |
| JP | 2017106787 A * | 6/2017 | | H04W 4/043 |
| WO | WO-2013136843 A1 * | 9/2013 | | G01C 21/16 |
| WO | WO 2018/134586 A1 | 7/2018 | | |
| WO | WO 2018/153811 A1 | 8/2018 | | |
| WO | WO 2019/228605 A1 | 12/2019 | | |

* cited by examiner

DETERMINING OF ABSOLUTE ALTITUDES OF FLOORS OF A STRUCTURE

CROSS-REFERENCE TO RELATED APPLICATIONS

This application claims priority to European Application No. 19155424.5, filed Feb. 5, 2019, the entire contents of which are incorporated herein by reference.

FIELD OF THE DISCLOSURE

The invention generally relates to the field of positioning and more specifically indoor positioning. The invention specifically relates to the determining of absolute altitudes of individual floors represented by an indoor map.

BACKGROUND

Indoor positioning requires novel systems and solutions that are specifically developed and deployed for this purpose. The "traditional" positioning technologies, which are mainly used outdoors, i.e. satellite and cellular positioning technologies, cannot deliver such performance indoors that would enable seamless and equal navigation experience in both environments. The required positioning accuracy (2-3 m), coverage (~100%) and floor detection are challenging to achieve with satisfactory performance levels with the systems and signals that were not designed and specified for the indoor use cases in the first place. Satellite-based radio navigation signals simply do not penetrate through the walls and roofs for the adequate signal reception and the cellular signals have too narrow bandwidth for accurate ranging by default.

Several indoor-dedicated solutions have already been developed and commercially deployed during the past years e.g. solutions based on pseudolites (GPS-like short-range beacons), ultra-sound positioning, BTLE signals and Wi-Fi fingerprinting. What is typical to these solutions is that they require either deployment of totally new infrastructure (beacons, tags and so on) or manual exhaustive radiosurveying of the buildings including all the floors, spaces and rooms. This is rather expensive and will take a considerable amount of time to build the coverage to the commercially expected level, which in some cases narrowed the potential market segment only to very thin customer base e.g. for health care or dedicated enterprise solutions. Also, the diversity of these technologies makes it difficult to build a globally scalable indoor positioning solution, and the integration and testing will become complex if a large number of technologies needs to be supported in the consumer devices, such as smartphones.

For an indoor positioning solution to be commercially successful, that is, 1) being globally scalable, 2) having low maintenance and deployment costs, and 3) offering acceptable end-user experience, the solution needs to be based on an existing infrastructure in the buildings and on existing capabilities in the consumer devices. This leads to an evident conclusion that the indoor positioning needs to be based on technologies such as Wi-Fi- and/or Bluetooth (BT)-technologies that are already supported in almost every smartphone, tablet, laptop and even in the majority of the feature phones. It is, thus, required to find a solution that uses radio signals (e.g. Wi-Fi- and BT-radio signals) in such a way that makes it possible to achieve 2-3 m horizontal positioning accuracy, close to 100% floor detection with the ability to quickly build the global coverage for this approach.

One approach for radio-based indoor positioning that models e.g. the Wi-Fi-radio environment (or any similar radio e.g. Bluetooth) from observed Received Signal Strength (RSS)-measurements as 2-dimensional radiomaps and is hereby able to capture the dynamics of the indoor radio propagation environment in a compressable and highly accurate way. This makes it possible to achieve unprecedented horizontal positioning accuracy with the Wifi-signals only within the coverage of the created radiomaps and also gives highly reliable floor detection.

Huge volumes of indoor Wi-Fi-measurements data can be harvested via so called crowd-sourcing if the consumer devices are equipped with the necessary functionality to enable the Wi-Fi-data collection as a background process, naturally with the end-user consent. It could also be possible to use volunteers to survey the sites (buildings) in exchange of reward or recognition and get the coverage climbing up globally in the places and venues important for the key customers. However, the technical challenges related to the harvesting, processing, redundancy, ambiguity and storing the crowd-sourced data need to be understood and solved first, before the Wifi-radiomap creation can be based on the fully crowd-sourced data.

An essential part in crowd-sourcing of radio fingerprints for indoor spaces is an altitude reference of the mobile device and their accuracy. Altitude information is crucial, especially indoors, where received radio signal strengths in one horizontal location vary drastically as a function of the altitude/floor level. This variation is partly/mostly due to building structures.

In a 3D indoor positioning system, that is based on crowdsourced radio samples with 3D reference locations, the altitude information typically originates from global measurement sources such as GNSS and/or barometer measurements, for example. Therefore, the radio samples' reference locations include absolute altitude references, and the system is unaware of any local floor indexing system that single buildings or building maps may have.

However, to be usable for an end user, a 3D indoor positioning system must be combined with so called indoor maps, relative to which the location is indicated to the end user. In many of such indoor maps, however, the altitude is expressed as a floor index, while the absolute altitudes of the floors are not necessarily included in an indoor map. Instead, indoor maps typically only include building-specific floor indexing that cannot be directly linked to absolute altitude values.

The problem with that is that crowdsourcing-based 3D indoor positioning systems typically output the location in coordinates representing latitude, longitude and absolute altitude, while the indoor map can be shown only for coordinates representing latitude, longitude and floor index. Therefore, indoor maps that lack absolute floor altitudes cannot be directly combined with an afore-described indoor positioning system. This is because there is no straightforward way to convert a (global/absolute) altitude to a (local/relative) floor index.

One option would be to establish an indoor positioning system where the radio samples' altitudes are expressed as floor indices manually input by a user. In this approach the person, who collects the radio samples, needs to input the floor indices to the radio map according to the building-specific floor indexing system. However, this is not an option in the case of crowdsourcing-based radio sample collection, because no manual interference must be required.

Alternatively, it would be conceivable to automatically learn the floors in a building by looking at the (multi-modal)

altitude distribution of the crowdsourcing-based radio sample collection. In theory, the matching of absolute altitudes and floor indices would be trivial; as there would be n altitudes for n floors. However, often some floors are used rarely or are even inaccessible, so that such a method might not detect all the floors that appear in the indoor map. Therefore, the matching of absolute altitudes and floor indices cannot in general be made unambiguously in such a way.

Another option would be to integrate absolute altitudes in the indoor map. However, indoor maps typically lack absolute altitudes for multiple reasons:

Floor indices are a more perceivable measure of altitude than absolute altitude for a human end user and therefore more useful in many applications.

Floor indices are typically visible in most buildings and therefore usable for navigation, while absolute altitudes are typically not visible.

Some indoor positioning systems are based on manually collected radio data, so here the altitude of the radio data can be expressed as a discrete floor index (given manually) rather than absolute altitude. This is only possible as the discrete floor index is given manually; an automatic collection of radio fingerprints would lead to absolute altitude measurements.

Using manually input floor indices can be preferred, because measuring the absolute altitude may not be straightforward, since GNSS measurement accuracy is low in the vertical dimension. This is due to bad satellite geometry; positioning signals of the satellites below the horizon level cannot be observed. Also, in general the quality of GNSS measurements is very low indoors.

Accuracy of a third-party map provider's indoor altitude data may not be reliable. The altitudes may have errors, for example, and different coordinate systems often cause confusion (e.g. between mean sea level altitude and a WGS 84 altitude).

For the abovementioned reasons, a system that utilizes indoor maps will benefit from determining the absolute altitudes of all the buildings' mapped floor levels in a consistent and scalable manner. Consistent means here that the absolute altitudes are expressed in the same coordinate system for each building, and scalable means that a large number of buildings can be mapped efficiently without manual labor.

If an indoor mapper wants to assign absolute altitudes to an indoor map, the altitudes must either be measured manually using e.g. a high-precision GNSS positioning system for each floor. Alternatively, if a 3D indoor positioning system gives the vertical location as an absolute altitude and the indoor map does not contain the absolute altitudes corresponding to the floor indices, a professional person must enter each floor and check which absolute altitude the 3D indoor positioning outputs in each floor. This way, each floor index can be assigned with an absolute altitude. However, even this process is expensive and non-scalable (requires human work) and error prone (how to guarantee that the indoor positioning system shows correct absolute altitude at each floor; a crowdsourcing-based indoor positioning system's accuracy may self-heal over time but the manually set absolute altitudes do not improve over time automatically).

Thus, currently, no automatic method for efficiently assigning the absolute floor altitudes of an indoor map's floor levels exists.

DESCRIPTION OF SOME EXAMPLE
EMBODIMENTS OF THE INVENTION

Thus, it is inter alia on object of the invention to automatically determine the absolute altitudes of a buildings' mapped floor levels. It is another objet of the invention to propose a method that learns the absolute altitudes of indoor maps' floor levels in a consistent, scalable, and self-healing manner using crowdsourced measurements, in particular so that no human labor or special hardware is required in either first-time estimation or updating the altitudes.

According to an exemplary aspect of the invention, a method is disclosed, performed by at least one apparatus, the method comprising:

obtaining location data representing at least one track of one or more users at least partially in a structure, said location data comprising horizontal location information and vertical location information, said vertical location information being representative of an absolute altitude;

obtaining indoor map data representing different floors of the structure and indicating structural elements on the different floors;

determining track sections of the at least one track represented by the location data such that each track section can be assumed to be on a single floor of the structure;

at least partially comparing determined track sections with floors of the structure represented by the indoor map data;

determining, based on said comparing, an absolute altitude of at least some of the floors of the structure represented by the indoor map data.

The method may for instance be performed and/or controlled by an apparatus, for instance by a mobile device and/or a server, e.g. an apparatus according to the exemplary aspects.

According to a further exemplary aspect of the invention an apparatus is disclosed, comprising means for performing a method according to the exemplary aspect of the invention. The means of the apparatus may be implemented in hardware and/or software. They may comprise for instance at least one processor for executing computer program code for realizing the required functions, at least one memory storing the program code, or both. Alternatively, they could comprise for instance circuitry that is designed to realize the required functions, for instance implemented in a chipset or a chip, like an integrated circuit. In general, the means may comprise for instance one or more processing means such as a processor and a memory. Optionally, the apparatus may comprise various other components, like a communication interface, a network interface, a radio interface, a data interface, a user interface etc.

According to a further exemplary aspect of the invention, an alternative apparatus is also disclosed comprising at least one processor and at least one memory including computer program code; the at least one memory and the computer program code configured to, with the at least one processor, cause the apparatus to at least perform a method according to the exemplary aspect of the invention.

The above-disclosed apparatuses according to the exemplary aspects of the invention may be a module or a component for a device, for example a chip. Alternatively, the disclosed apparatus according to any aspect of the invention may be a device, for instance a mobile device or a server. The disclosed apparatus according to any aspect of the invention may comprise only the disclosed components, for instance means, processor, memory, or may further comprise one or more additional components.

According to a further exemplary aspect of the invention, a computer program code is disclosed, the computer program code, when executed by a processor, causing an apparatus to perform a method according to the exemplary aspect of the invention.

The computer program may be stored on computer-readable storage medium, in particular a tangible and/or non-transitory medium. The computer readable storage medium could for example be a disk or a memory or the like. The computer program could be stored in the computer readable storage medium (e.g. according to the exemplary aspect of the invention) in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, a non-transitory computer readable storage medium in which computer program code is stored, the computer program code when executed by a processor causing at least one apparatus to perform a method according to the exemplary aspect of the invention. The storage medium may be a tangible storage medium, for example a tangible computer-readable storage medium. The storage medium may be a storage medium of a mobile device, for example an apparatus according to the exemplary aspects of the invention.

In the following, exemplary features and exemplary embodiments of all exemplary aspects of the present invention will be described in further detail.

The location data may originally be obtained by one or more users (or more precisely the mobile devices of the respective users) while surveying the structure, for instance in the scope of a crowdsourcing process. The location data may for instance be or comprise fingerprints collected by a user, at least comprising location data with horizontal and vertical location information. The location data may also comprise uncertainty values regarding the horizontal and/or vertical location information.

A structure may be any structure which may have an indoor area and/or multiple floors. Example structures may be a building, a part of a building, a tower, a mall, on office building, a house, a public building, a hospital or the like.

The absolute altitude represented by the vertical location information may be an altitude with respect to a (global) reference altitude, such as the mean sea level or the WGS 84 reference ellipsoid. The vertical location information may represent an absolute attitude in meters or feet, for instance.

The locations data may not only comprise horizontal and vertical location, but also further information typically collected for a radio-based indoor positioning system. Such further information may for instance be radio measurements (e.g. of cellular or non-cellular communication systems) at respective locations at the structure. The radio measurements may be measurements of cellular or non-cellular communication networks, i.e. a radio network employing a cellular or non-cellular radio technology.

Examples of a non-cellular communication system or network are a WLAN (e.g. a WiFi or IEEE 802.11) system, a Bluetooth (LE) system, a ZigBee system, a radio-frequency identification (RFID) system, a broadcasting network such as for instance Digital Video Broadcasting (DVB), Digital Audio Broadcasting (DAB) or Frequency-Modulated (FM)/Amplitude-Modulated (AM) system, a Near Field Communication (NFC) system, etc.

Examples of a cellular communication system or network are a second generation (2G, for instance the Global System for Mobile Communication (GSM), the General Packet Radio System (GPRS), the Enhanced Data Rates for GSM Evolution (EDGE) or the High Speed Circuit-Switched Data (HSCSD)), third generation (3G, for instance the Universal Mobile Telecommunication System, UMTS, WCDMA, TD-SCDMA or CDMA-2000), fourth generation (4G, for instance the Long Term Evolution, LTE system, the LTE Advanced (LTE-A) system or the IEEE 802.16m WiMAX system) or fifth generation (5G) communication system or network. Further examples of a cellular communication system or network are a Low Power Wide Area Network (LPWAN). A Low Power Wide Area Network (LPWAN) is in particular understood to be a wireless telecommunication wide area network designed to allow long range communications (e.g. over hundreds of meters or over kilometers) at a low bit rate. Non-limiting examples of an LPWAN are a Narrowband IoT (NB-IoT) network, standardized by the 3rd Generation Partnership Project (3GPP), a network based on LoRa technology (e.g. LoRaWAN) or a Sigfox network.

More generally, a cellular communication system may for instance be characterized by a basically seamless pavement of a geographical area (usually in the order of at least hundreds or thousands of square kilometers) with cells in which coverage is provided by respective nodes of the communication system that are operated by the same operator, which network may for instance support communication handover between cells. Consequently, a non-cellular communication system may be characterized as a communication system that does not have all of these properties.

The location data represents at least one track, i.e. a path the user has taken at (e.g. in or in the proximity of the structure). The location data may form a substantially continuous track. However, the track may also have gaps and be intermittent or discontinuous. The horizontal and/or vertical location information may be collected automatically by means of various approaches, as will be explained in more detail further below.

For instance, the vertical location information representing an absolute altitude may be estimated using a global navigation satellite system (GNSS), a barometer, an inertial sensor, other sensors of a user's mobile device and/or an altitude map. For instance, the vertical location information (e.g. 3D reference positions) can originate from a sensor fusion of e.g. a GNSS sensor, inertial sensors and a barometer, optionally supported by altitude map information. Such an altitude map can generally be estimated by combining information from a plurality of tracks comprising altitude estimates. For generating an altitude map, furthermore, areas with multiple layers, levels or floors can also be detected and the absolute layer altitudes can be estimated by applying for instance a clustering algorithm to a set of altitude estimates in each geographical location. However, as explained, such an approach is often not sufficient for estimating the absolute altitude of all the floors of a structure.

There is not necessarily vertical location information for every location or point of the track (i.e. for every piece of horizontal location information). For instance, the vertical location information may be provided only at certain reference locations and/or only at certain intervals, e.g. every now and then. The horizontal location information may be provided with a higher precision and/or more frequently along the track.

The location data may be obtained from a different apparatus or from a component (e.g. a memory) of the apparatus performing the method.

The indoor map data may represent only a single structure or multiple structures. The indoor map may comprise floor indices for the different floors represented by the indoor map data. Thus, the indoor map data may be understood to comprise relative altitude data (i.e. the floor indices for instance). The indoor map may only comprise relative altitude data. The indoor map data may or may not comprise absolute altitude information. In case, the indoor map data does not comprise absolute altitude information, the described method may allow determining and/or assigning absolute altitude information to one or more of the floors represented by the indoor map data. In case, the indoor map data comprises absolute altitude information, the described method may allow updating absolute altitude information of one or more of the floors represented by the indoor map data.

A relative altitude is understood to be altitude difference from a (local) reference altitude. For example a floor index ("0", "1", "2", . . . ) is understood to be a relative altitude, i.e. relative to floor "0".

The indoor map data may comprise a floor plan or ground view of some or each of the floors of the structure. For instance, the indoor map data may comprise or represent at least the boundary (e.g. the outer or outside walls) of some or each floor of the structure. For instance, the indoor map data may comprise or represent at least the entrances (i.e. the entrance locations) of some or each of the floors of the structure. The indoor map data may be a reduced version having a reduced information content compared to a typical indoor map. For instance the indoor map data may only comprise or represent certain critical features used in the comparing of the track sections and floors (e.g. in a horizontal matching thereof). For instance, the indoor map data may only comprise or represent the boundary (i.e. the outer perimeter) and entrances of respective floors. This may lead to a more efficient comparing of the track sections with floors of the structure represented by the indoor map data. Nevertheless, the indoor map data may also comprise information on the inner structure of the floors, such as inner walls and entrances.

Especially when only such reduced indoor map data is used, it is noted that some further assumptions may have to be made. For instance, it may be assumed that the ordering of the floors is known, i.e. that e.g. floor 2 is higher in altitude than floor 1, for example. Additionally or alternatively, assumptions on the floor heights may be made. These assumptions might include one or more of the following:

1. The floor heights are assumed to be known precisely or approximately.
2. Constant floor height is assumed for a structure.
3. A set of floor altitudes is known based on e.g. methods for detecting a multi-floor area and their absolute floor altitudes from crowdsourced data, but it may not be known exactly to which floor indices these floor altitudes correspond.

The indoor data may be obtained from a different apparatus or from a component (e.g. a memory) of the apparatus performing the method.

The track sections may be track sections of a predetermined length, e.g. in space and/or time, such as 5-second track sections or 10-meter track sections. The track sections may be obtained by dividing a track of a user into respective track sections. The track may be divided into track sections based on the vertical location information of a track. The determined track sections may then be represented by respective subsets of the location data representing the track. Some or preferably each of the determined track sections may comprise vertical location information (e.g. at least one absolute altitude value). A track section can be assumed to be on a single floor of the structure e.g. if the absolute altitude of a track does not or not significantly (e.g. below a predefined threshold) change throughout the respective track section.

The track sections are then at least partially compared with the floors of the structure. Thus, the locations data (or a part thereof) is compared with the indoor map data (or a part thereof). A comparing may for instance comprise a comparison of a respective track section with one or more (e.g. all) floors of the structure. For instance, a track section (e.g. the course of the track section) may be compared with certain features of the floor (such as the inner wall, the boundary, and/or the location of (inner and/or outer) doors or entrances of the respective floor). A track section may be compared with a geometrical feature of the respective floor. The comparing may provide information on how well a certain track section matches with a certain floor. Examples and preferred embodiments of how such a comparing can be realized will be described in more detail below.

Based on said comparing, an absolute altitude of at least some of the floors of the structure represented by the indoor map data can then be determined. The determined absolute altitudes or a value representative thereof can then be assigned to the respective floors. For instance, the indoor map data may be extended or updated with respective absolute altitudes for respective floors. The determining may be understood as estimating the absolute altitude of respective floors (e.g. by utilizing statistical means). Examples and preferred embodiments of how such a determining can be realized will be described in more detail below.

The described approach may have the advantage that the absolute altitudes of (possible reduced) indoor maps' floor levels are learned in a consistent, scalable, and self-healing manner using location data (in particular crowdsourced measurements). No human labor or special hardware is required in either first-time estimation or updating the altitudes. While building-specific air conditionings may cause local biases to (e.g. barometer-based) altitude data, the proposed method helps to mitigate this problem, because exactly the same biases will appear in the floor altitudes. While the accuracy and error-freeness of the floor altitude estimates cannot in general be guaranteed without manual quality control, the advantage of the described approach is that, when more and more crowdsourced location data is accumulated, the altitude estimates can be expected to converge to the correct values in many cases.

According to an exemplary embodiment of the different exemplary aspects of the invention, the method further comprises:

transforming, based on said determined absolute altitude of at least some of the floors of the structure, vertical location information representative of an absolute altitude into vertical location information representative of a floor of the structure or vertical location information representative of a floor of the structure into vertical location information representative of an absolute altitude.

After determining the absolute altitude of some or each floor or floor index of an indoor map, there is the advantage that a floor index can be directly transformed to an absolute altitude and an absolute altitude can be transformed to a floor index. For instance, if there is an altitude of any information or item (e.g. the of a position estimate, of a radio sample, of a radio map item, of a received signal strength map, of an access point location, and/or of a coverage area) expressed as an absolute altitude, it can be directly be transformed or mapped to a floor index corresponding to the floor with the closest absolute altitudes and vice versa. In this way, a position estimate with an absolute altitude estimate can be visualized on an indoor map that uses floor indices, or otherwise represented with respect to the indoor map floor indexing.

According to an exemplary embodiment of the different exemplary aspects of the invention, the location data is crowdsourcing data obtained by a plurality of users in a crowdsourcing process. Thus, the location data may have been collected by a plurality of user with a plurality of respective (mobile) devices. The users may be end users collecting the location data on their devices by means of a background process. Alternatively, the users may also be instructed to specifically collect location data at a certain structure. As already explained, the advantage of crowdsourced location data is that in this way a large number of samples covering a large geographical area can be obtained efficiently. Since this data (due to the automatic collection) typically only comprises absolute altitude information, a 3D indoor positioning system will return locations with absolute altitude information, which can normally not be used in combination with indoor map data only comprising (relative) floor indices. However, due to the described approach, it is possible to use this location data collected via crowdsourcing in order to determine and assign absolute altitudes to the floors represented by the indoor map data.

According to an exemplary embodiment of the different exemplary aspects of the invention, the vertical location information is based on one or more of the following:

signals of a global navigation satellite system observed at a device of a respective user;
signals of a cellular communication system observed at a device of a respective user;
signals a non-cellular communication system observed at a device of a respective user;
a barometer of a device of a respective user;
a motion sensor of a device of a respective user;
an accelerometer of a device of a respective user;
a magnetometer of a device of a respective user;
a gyroscope of a device of a respective user;
an altitude map; and/or
a manual user input of a respective user.

Any of the embodiments has the advantage that either the vertical location information does not need to be input manually by a user and can be obtained efficiently in the scope of a crowdsourcing process or, in case of a manual user input, that no additional sensors need to be provided or that no signals need to be evaluated.

Examples of a global navigation satellite system (GNSS) are the Global Positioning System (GPS), Galileo, Global Navigation Satellite System (i.e. "Globalnaja Nawigazionnaja Sputnikowaja Sistema", GLONASS) or Quasi-Zenith Satellite System (QZSS).

Examples of cellular (e.g. a 2G/3G/4G/5G cellular communication system) and non-cellular (e.g. WLAN) communication systems have already been described.

A barometer may perform (ambient) pressure measurements. A barometer may be integrated in the respective mobile device of the user. Alternatively, the barometer may be realized as a separate device, e.g. a Bluetooth tag with an integrated barometer.

A motion sensor, an accelerometer, a magnetometer and/or a gyroscope may be used to track the movement of the user (or their device). Since also vertical movement may be recorded, these sensors may help tracking the vertical location of the user (or their device) in particular after an absolute reference measurement has been obtained (e.g. via a barometer or via GNSS) and in particular also indoors.

According to an exemplary embodiment of the different exemplary aspects of the invention, the method further comprises:

selecting, from the determined track sections, track sections to be used for said comparing determined track sections with floors of the structure represented by the indoor map data.

A track section may be selected and used by selecting and using respective subsets of location data, for instance. At least or only those selected track sections may then be used for comparing determined track sections with floors of the structure represented by the indoor map data.

For instance, the track sections that contain the most relevant information for determining absolute floor altitudes are selected. Track sections with the most relevant information for determining the absolute floor altitude may in particular be those, where there is a high probability that a track section matches with one or more floors but is in conflict with one or more floors. Preferably, an as low as possible number of track sections is selected in order to reduce the processing load and the number of correlated measurements.

According to an exemplary embodiment of the different exemplary aspects of the invention, the selecting of track sections to be used for said comparing comprises selecting at least some or all of the track sections intersecting with a floor boundary indicated by the indoor map data and/or selecting track sections such that altitudes associated with the track sections substantially cover the whole altitude range of the track.

Selecting tracks in this way provides a high possibility that it can be decided (comparably unambiguously) that a track section matches with one or more floors, but is in conflict with one or more other floors. For instance, only those track sections where the track intersects with a floor polygon edge are selected. Additionally or alternatively, additional track sections can be selected such that altitudes associated with the track sections substantially cover the whole altitude range of the track, for instance such that all the altitude bands (e.g. 100 m+/−1 m, 103.5 m+/−1 m, etc.) observed during recording of the track are covered. For example, first those track sections where the track intersects any floor polygon edge are selected. Then also each track section is selected where the altitude difference from any previously selected track section is significant (for instance at least one floor level, e.g. 3.5 meters).

According to an exemplary embodiment of the different exemplary aspects of the invention, the comparing comprises:

determining, for at least some combinations of track sections and floors, a weighting factor indicating the matching of a respective track section to a respective floor.

Matching of a respective track section to a respective floor is understood to mean an indication of how well a track section is in line with floor. This may indicate to what degree a track sections can be believed to belong to a certain floor to be recorded in a certain floor. Preferably this determining is performed for all combinations, i.e. for all (selected) track sections and for all floors represented by the indoor map data.

According to an exemplary embodiment of the different exemplary aspects of the invention, the determining of a weighting factor is based on the matching of the horizontal location information of the respective track section with the horizontal geometry of the respective floor. Thus, the weighting factor can be considered to be based on how well the horizontal location information a respective track section matches with the horizontal geometry of the respective floor. For instance, the weighting factor may be designed such that the better the matching between the respective track section and the respective floor the higher the weighting factor. In an example, for each selected track section, a weighting factor is determined for each floor based on how well the respective track section matches with the horizontal geometry of the floor. Thus the total number of number of weights is the number of floors times the number of selected track sections.

According to an exemplary embodiment of the different exemplary aspects of the invention, in case a respective track sections intersects with a floor boundary of the respective floor indicated by the indoor map data, the weighting factor is determined such that the closer to an entrance of the respective floor the respective track section intersects with a floor boundary of the respective floor the higher the weighting factor; and/or in case a respective track section intersects with a floor boundary of the respective floor indicated by the indoor map data and there is no entrance in that respective floor, the weighting factor is set to a predetermined value; and/or in case a respective track section does not intersect with a floor boundary of the respective floor indicated by the indoor map data, the weighting factor is set to a predetermined value.

These embodiments allow efficiently determining a weighting factor reliably indicating the degree of matching between a track section and a respective floor. As already explained, a (inner or outer) floor boundary may in particular be understood to be an (inner or outer) floor polygon edge. An entrance may be understood to be any structure that can be used to (horizontally and/or vertically) enter and/or exit a certain floor or a part thereof. Thus, doors, stairs, escalators and elevators are example features providing respective entrances for a certain floor.

In case a respective track section intersects with a floor boundary of the respective floor indicated by the indoor map data and there is no entrance in that respective floor, the (first) predetermined value, to which the weighting factor is set, may be a comparably low value, for instance "0".

In case a respective track section does not intersect with a floor boundary of the respective floor indicated by the indoor map data, the (second) predetermined value, to which the weighting factor is set, may be higher than the first predetermined value (e.g. higher than 0) but lower than the weighting factor in cases where an intersection close to an entrance exists.

For instance, the highest weights are given to those combinations of track sections and floors, where the track section intersects with the floor boundary closest to an entrance.

In one example, for each floor f where the ith track section intersects with the floor boundary, the distance $d_{f,i,e}$ from the intersection point to each entrance e located in the floor is computed (if there are any entrances in the floor). Compute the weight $\hat{W}_{f,i}$ with a formula that is a decreasing function of each distance $d_{f,i,e}$. For example, the function may be a Gaussian function, for instance:

$$\hat{W}_{f,i} = \begin{cases} \sum_e \frac{1}{\sqrt{\sigma_{horiz_i}^2 + p_1^2}} \exp\left(-\frac{1}{2} \frac{d_{f,i,e}^2}{\sigma_{horiz_i}^2 + p_1^2}\right), & \text{if there is at least one entrance in floor } f \\ 0, & \text{otherwise} \end{cases}$$

where $\sqrt{}$ denotes the square-root, $\Sigma_e$ denotes the sum over the entrance indices e, exp( ) is the exponential function, $p_1$ is a parameter that describes the typical entrance width, e.g. $p_1=1$ meter, and $\sigma_{horiz\ i}$ is the horizontal location's standard deviation, in particular at the point of intersection of the track section with the floor boundary. Based on this formula, a floor where the track section intersects the floor boundary close to an entrance gets a high weight.

For each floor f where the ith track section does not intersect with the floor boundary, the weight $\hat{W}_{f,i}$ can be a constant. This constant can be smaller than the weight of a combination of track section and floor where the track section intersects the floor boundary with a small distance $d_{f,i,e}$ and otherwise larger. For example, the following function is possible:

$$\hat{W}_{f,i} = \frac{1}{\sqrt{\sigma_{horiz_i}^2 + p_2^2}}$$

where $p_2$ is parameter that is larger than $p_1$ e.g. $p_2=100$ meters. This weight accounts for the possibility that the user did not actually use any entrance.

According to an exemplary embodiment of the different exemplary aspects of the invention, the determination of the weighting factor is influenced by a determination, based on the location data, of whether the user was completely inside the structure, completely outside the structure or switched between inside the structure and outside the structure.

The determination of whether the user was completely inside the structure, completely outside the structure or switched between inside the structure and outside the structure is preferably only based on the location data (and for instance not on the indoor map data). The weighting factor may be determined or corrected (after being determined as described before, for instance) according to the determination of whether the user was completely inside the structure, completely outside the structure or switched between inside the structure and outside the structure. As an example, a determination of whether the user was completely inside the structure, completely outside the structure or switched between inside the structure and outside the structure may be based on the availability of GNSS signals.

For instance, the availability of GNSS positioning can be used as a further measurement of whether the user entered or exited a structure or was all the time inside the structure. This measurement can be used e.g. using one or more of the following rules:

i. If a GNSS signal is regularly available both before and after a respective track section, the weighting factor of those combinations of track sections and floors where the respective track section is completely outside the floor boundary is increased.

ii. If a GNSS signal becomes available during the course of a respective track section, the weighting factor of those combinations of track sections and floors where the track section exits the floor boundary is increased.

iii. If a GNSS signal stops being available during the course of a respective track section, the weighing factor of those combinations of tack sections and floors where the track section enters the floor boundary is increased.

iv. If a GNSS signal is not available either before or after the course of a respective track section, the weighting factor those combinations of track sections and floors where the track section is completely inside the floor boundary is increased.

According to an exemplary embodiment of the different exemplary aspects of the invention, the determining of an absolute altitude of at least some of the floors comprises:

computing, for at least some combinations of track sections and floors, a likelihood function indicating the likelihood of the absolute altitude of a respective floor based on a respective track section.

The computing may be performed for each combination of tack section and floor for which a weighting factor was determined, for instance. A likelihood function may be understood to be an (e.g. un-normalized) probability density function. For instance, the likelihood function is based on a Gaussian function.

According to an exemplary embodiment of the different exemplary aspects of the invention, the likelihood function is based on a mixture distribution. For instance, the mixture distribution is a linear combination (e.g. a sum) of two distributions. For instance, the mixture likelihood function is based on a linear combination of two Gaussian functions.

In one example, for each floor f and track section i, the likelihood function of the floor altitude alt is computed such that the higher the weight, the more the likelihood is concentrated close to the track section's altitude $alt_i$. One example of a formula for the likelihood function is based on a mixture distribution, e.g.

$$\ell_{f,i}(alt) = \mathbb{P}_{f,i} \cdot \frac{1}{\sqrt{2\pi}\sigma_{alt_i}^2} \exp\left(-\frac{1}{2}\frac{(alt-alt_i)^2}{\sigma_{alt_i}^2}\right) +$$

$$(1-\mathbb{P}_{f,i}) \cdot \left(1 - \exp\left(-\frac{1}{2}\frac{(alt-alt_i)^2}{\sigma_{alt_i}^2}\right)\right) \cdot C_i$$

where $\mathbb{P}_{f,i}$ is the (normalized) probability of floor f, which may be defined with the weighting factors $\hat{W}_{f,i}$ as $$\mathbb{P}_{f,i} = \frac{\hat{W}_{f,i}}{\sum_g \hat{W}_{g,i}}$$

and $C_i$ is a constant number that ensures integrability to one, e.g.

$$C_i = \left(\eta - \sqrt{2\pi}\sigma_{alt_i} \cdot \left(\Phi\left(\frac{0.5\eta}{\sigma_{alt_i}}\right) - \Phi\left(-\frac{0.5\eta}{\sigma_{alt_i}}\right)\right)\right)^{-1},$$

where η is an approximate structure altitude e.g. η=[number of floors]×floor height (e.g. 3.5 meters) and Φ is the cumulative distribution function of the standard normal distribution (this formulation ensures that the latter term integrates to $(1-\mathbb{P}_{f,i})$). The first term of this mixture distribution covers the case that the track section is (likely) in floor f so floor f's altitude is close to $alt_i$, and the latter term covers the case that the track section is in any other floor, so floor f's altitude can be anything but close to $alt_i$.

According to an exemplary embodiment of the different exemplary aspects of the invention, the determining of an absolute altitude of at least some of the floors comprises:

computing, for at least some floors, an altitude probability function indicating the probabilities of absolute altitudes of a respective floor.

Preferably, an altitude probability function is computed for each floor. For instance, the probability function is a probability density function or distribution. A probability function of a certain floor may indicate the probability of that floor having a certain absolute altitudes.

According to an exemplary embodiment of the different exemplary aspects of the invention, the computing of a respective altitude probability function is based on the computed likelihood functions of the respective floor. For instance, the computing of a respective altitude probability function comprises combining, e.g. multiplying, the computed likelihood functions.

Specifically, the likelihood functions of all the track sections can be combined to get a (possibly unnormalized) probability density function for each floor's absolute altitude. One option to combine the likelihood functions is $l_{f,i}$ to multiply them according to the rules of probability:

$$\tilde{p}_f(alt) = \prod_i \ell_{f,i}(alt)$$

where $\Pi_i$ denotes the product over all the track sections. In one example, the combination of the likelihood functions can be implemented by first evaluating the likelihood functions for each selected track section i for the respective floors f at specific points, e.g. at the points of an (e.g. regular) altitude grid, such as {smallest measured altitude (sma), sma+1 m, sma+2 m, . . . , largest measured altitude}. This facilitates the computation, since the number of likelihood functions grows with the number of track sections and the likelihood functions may have complicated forms which may include several parameters for each track section (e.g. $\mathbb{P}_{f,i}$, $alt_i$, $\sigma_{alt\,i}$ for each track section). If the number of tracks is large, it gets difficult, if not infeasible, to store all these parameters.

According to an exemplary embodiment of the different exemplary aspects of the invention, the determining of an absolute altitude of at least some of the floors comprises:

computing probability values for different sets of potential absolute altitudes of at least some of the floors of the structure.

For instance, a probability value is computed for each set of potential absolute altitudes of each floor of the structure. For instance, a set of potential absolute altitudes is defined by an absolute altitude for at least some, preferably each floor. For instance, a set of potential absolute altitudes is defined an absolute altitude for the first floor and a floor height candidate.

According to an exemplary embodiment of the different exemplary aspects of the invention, a respective probability value is based on values of the probability function for the respective floors being at respective absolute altitudes.

For instance, a respective probability value is based on a multiplication of the values of the probability function for the respective floors being at respective absolute altitudes.

In one example, a (possibly unnormalized) probability value $p(alt1_k, h_j)$ for a specific set of potential absolute altitudes (defined by a $1^{st}$ floor altitude candidate $alt1_k$ and a floor height candidate $h_j$) of each of the floors of the structure is determined by $$\tilde{p}(alt1_k, h_j) = \Pi_f \tilde{p}_f(alt1_k + (f-1) \cdot h_j),$$

where $\Pi_f$ denotes the product over all floors. For instance, it may be looped over each possible combination of absolute floor altitudes and a probability number may be evaluated for each combination.

According to an exemplary embodiment of the different exemplary aspects of the invention, the determining of an absolute altitude of at least some of the floors comprises:

choosing absolute altitudes for at least some of the floors of the structure such that the probability value is maximized.

Preferably, an absolute altitude for each floor of the structure is chosen in this way. For instance, this may be done by choosing the absolute altitudes of the floors (that is for example a combination of the $1^{st}$ floor absolute altitude and the floor height), which best explain the recorded track sections. For example, choose the combination of $(alt1_k, h_j)$ that maximizes the value of the probability $p(alt1_k, h_j)$.

According to an exemplary embodiment of the different exemplary aspects of the invention, the method further comprises:

using said determined absolute altitude of at least some of the floors of the structure for representing vertical location information representative of an absolute altitude with respect to floors represented by an indoor map.

For instance, the determined absolute altitudes may be advantageously used in (e.g. visually) representing or outputting a position estimate, radio data or other items or information (only comprising absolute altitude information) with respect to an indoor map (only comprising relative floor indexing).

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 6b is an exemplary illustration of likelihood functions derived from a comparison of the track section and different floor geometries shown in FIG. 6a;

DETAILED DESCRIPTION

The following description serves to deepen the understanding of the present invention and shall be understood to complement and be read together with the description as provided in the above summary section of this specification.

Figure 1:
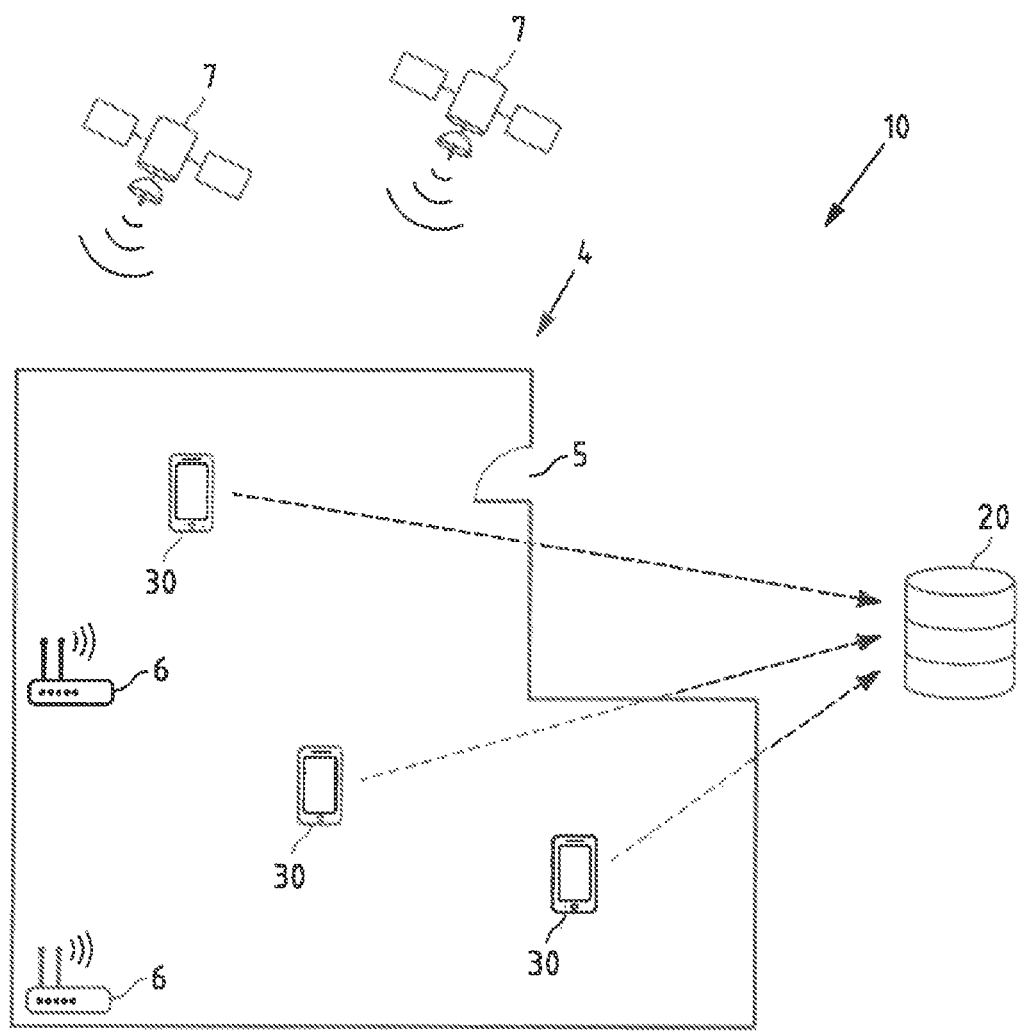
FIG. 1 is a diagram of a system for performing exemplary embodiments of the invention.

FIG. 1 is a diagram of a system 10 for performing exemplary embodiments of the invention. System 1 comprises a remote server 20 and a plurality of mobile devices 30, which are used for crowdsourcing of a structure 4. Exemplarily shown is only a single floor of structure 4 comprising an entrance 5. The mobile devices 3 are used for collecting fingerprints of the environment in a crowdsourcing process, i.e. also in and around structure 4. The fingerprints comprise combinations of radio measurements and location data. The radio measurements may be based on signals from non-cellular communications systems, such as signals from exemplarily WLAN access points 6. Likewise, the radio measurements may comprise measurements of other cellular or non-cellular signals. The location data comprises information on where the respective radio measurements were taken. The location data comprises horizontal and vertical location data forming a track taken by the user of the respective mobile 30 device through the structure 4. The location data may be based on signals from satellites 7 of a global navigation satellite system (GNSS). While such signals may only or primarily be available outside of structure 4, the location data may alternatively or preferably additionally be based on sensors of the respective mobile devices 30, such as a barometer, a motion sensor, an accelerometer, a magnetometer and/or a gyroscope. Server 20 inter alia collects location data from mobile devices 30 allowing server 20 to perform embodiments of the method of the invention, as will be described in the following.

Figure 2:
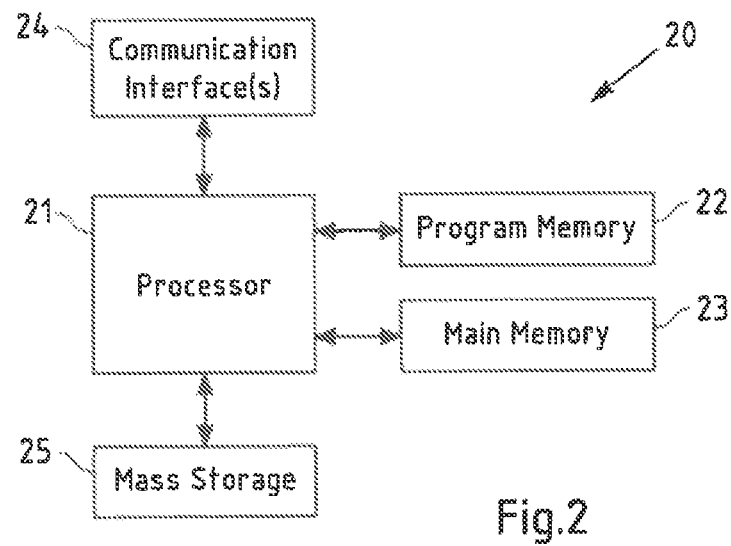
FIG. 2 is a block diagram of the server of FIG. 1 as an example of an apparatus according to the different aspects of the invention.

FIG. 2 is a block diagram of the server of FIG. 1 as an example of an apparatus according to the different aspects of the invention.

Server 20 comprises a processor 21. Processor 21 may represent a single processor or two or more processors, which are for instance at least partially coupled, for instance via a bus. Processor 21 may use program memory 22 and main memory 23 to execute a program code stored in program memory 22 (for instance program code causing server 20 to perform embodiments of the different methods, when executed on processor 21). Some or all of memories 22 and 23 may also be included into processor 21. One of or both of memories 22 and 23 may be fixedly connected to processor 21 or at least partially removable from processor 21. Program memory 22 may for instance be a non-volatile memory. It may for instance be a FLASH memory, any of a ROM, PROM, EPROM and EEPROM memory or a hard disc, to name but a few examples. Program memory 22 may also comprise an operating system for processor 21. Main memory 23 may for instance be a volatile memory. It may for instance be a RAM or DRAM memory, to give but a few non-limiting examples. It may for instance be used as a working memory for processor 21 when executing an operating system and/or programs.

Processor 21 further controls one or more communication interfaces 24 configured to receive and/or send information. For instance, server 20 may be configured to communicate with mobile device 30 of system 10 of FIG. 1. Such a communication may for instance comprise receiving collected fingerprints, i.e. in particular location data, from mobile devices 30. Also, server 20 may be able to send e.g. a determined radio map or a determined position estimate of a mobile device to mobile device 30 for the purpose of positioning. The communication may for instance be based on a (e.g. partly) wireless connection. The communication interface 24 may thus comprise circuitry such as modulators, filters, mixers, switches and/or one or more antennas to allow transmission and/or reception of signals. In embodiments of the invention, communication interface 24 is inter alia configured to allow communication according to a 2G/3G/4G/5G cellular communication system and/or a non-cellular communication system, such as for instance a WLAN network.

Processor 21 further interfaces with a mass storage 25, which may be part of the server 20 or remote from server 20, and which may for instance be used to store one or more databases. For instance, server 20 may store, in a database, collected fingerprints and thus locations data collected by mobile device 30. Further sever 20 may store in a database indoor map data. Further, server 20 may store in a database determined radio maps.

The components 22-25 of server 20 may for instance be connected with processor 21 by means of one or more serial and/or parallel busses.

Figure 3:
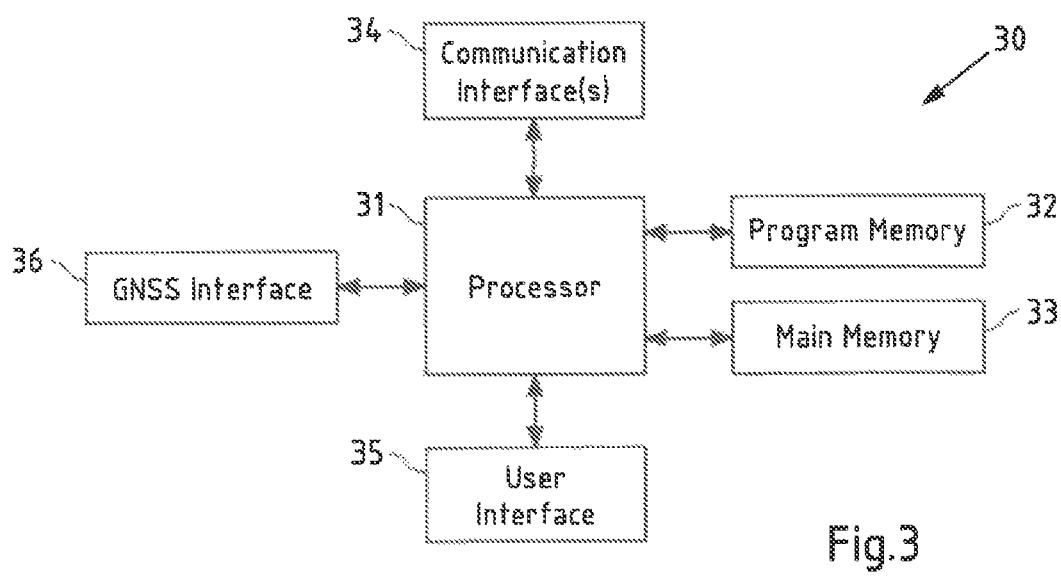
FIG. 3 is a block diagram of a mobile device of FIG. 1 as an example of an apparatus according to the different aspects of the invention.

FIG. 3 is a block diagram of a mobile device 30 of FIG. 1 as an example of an apparatus according to the different aspects of the invention. Mobile device 30 comprises a processor 31, program memory 32 and main memory 33, which may be designed and configured as already explained with respect to apparatus 20, for instance. Specifically, processor 31 may use program memory 32 and main memory 33 to execute a program code stored in program memory 32 (for instance program code allowing mobile device 30 to observe radio signals and to collect fingerprints, in particular location data).

Processor 31 further controls a communication interface 34 configured to receive and/or send information. For instance, mobile device 30 may be configured by means of communication interface(s) 34 to observe radio signals of WLAN access points 6 or other radio nodes. Further mobile device 30 may be configured to communicate with server 20, in order to send collected fingerprints and in particular location data. Therein, the described communication may for instance be based on a (e.g. partly) wireless connection. As described before, the communication interface 34 may comprise circuitry such as modulators, filters, mixers, switches and/or one or more antennas to allow transmission and/or reception of signals. For instance, communication interface 34 is at least configured to allow communication according to a non-cellular communication system, such as for instance a Bluetooth, ZigBee or WLAN network, in particular to communicate with server 20. In embodiments of the invention, communication interface 34 may also be configured to allow communication according to a 2G/3G/4G/5G cellular communication system, in particular to communicate with server 20.

Processor 31 further controls a user interface 35 configured to present information to a user of mobile device 30 to receive information from such a user, such as manually input position fixes, a site map or floor plan of the area or the like. User interface 34 may for instance be the standard user interface via which a user of mobile device 30 controls other functionality thereof, such as making phone calls, browsing the Internet, etc.

Processor 31 may further control a GNSS interface 36 configured to receive location information of a GNSS such as Global Positioning System (GPS), Galileo, Global Navigation Satellite System (i.e. "Globalnaja Nawigazionnaja Sputnikowaja Sistema", GLONASS) or Quasi-Zenith Satellite System (QZSS). In case of mobile device 30, the location information of GNSS interface 36 (potentially in connection with further sensors of mobile device 30, such as an inertial sensor, an accelerometer or gyroscope) may be used in order to obtain location data.

Again, the components 32-36 of mobile device 30 may for instance be connected with processor 31 by means of one or more serial and/or parallel busses.

The methods of the different aspects will now be described in more detail with respect to FIGS. 4 to 7.

Figure 4:
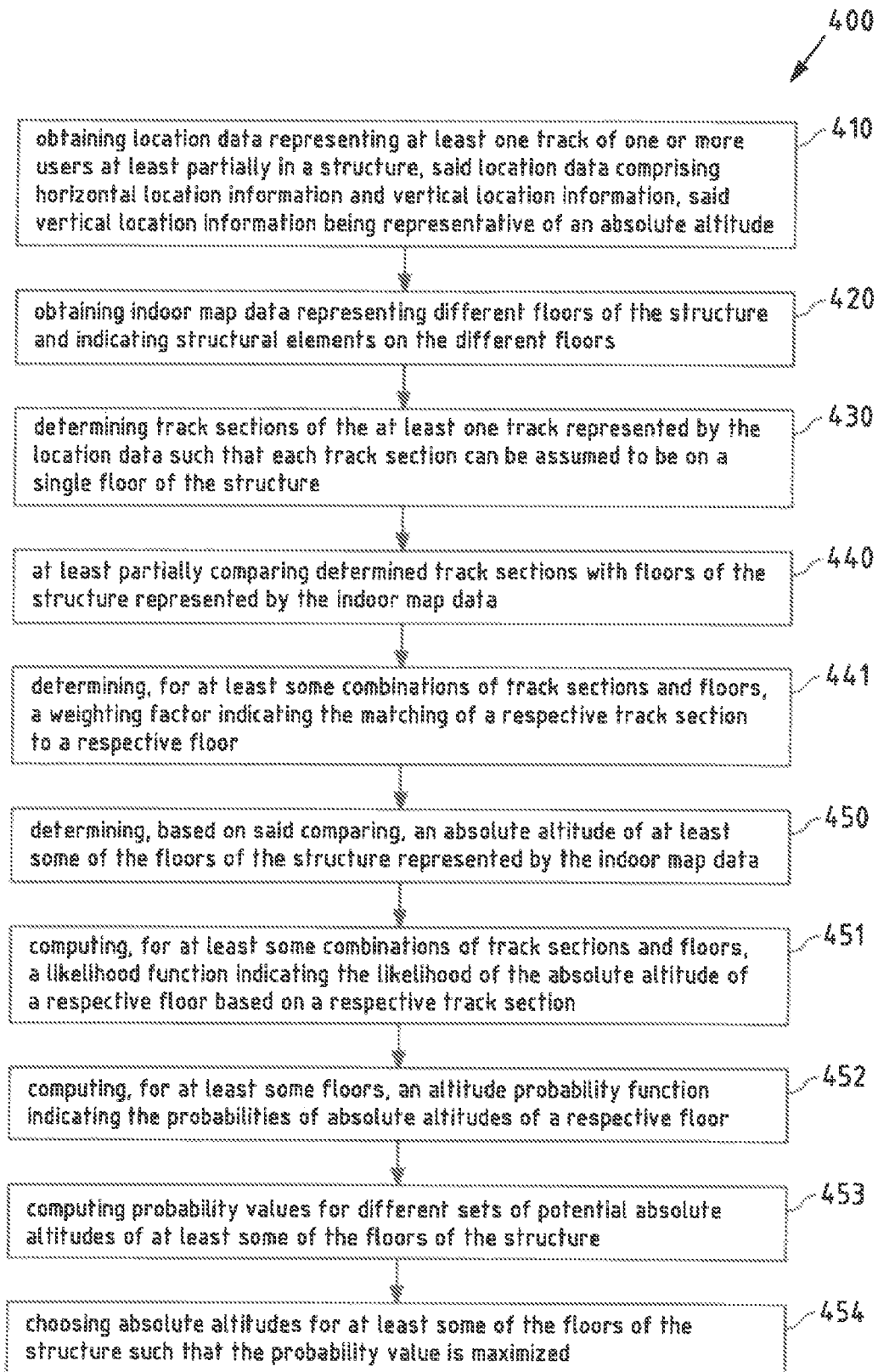
FIG. 4 is a flow chart illustrating an example of a method according to the invention.

FIG. 4 is a flow chart 400 illustrating an example of a method according to the invention.

In short, the described method can be used to estimate the absolute altitude of each floor index of an indoor map using crowdsourced location data. Therein, the crowdsourced location data can represent tracks with 3D reference positions including absolute altitudes. Based on the altitudes, each track can be divided into track sections that can, based on altitude readings, be assumed to be in a single floor level (such as action 430). The horizontal shape of each track section is then compared with the indoor map geometry of each floor level (such as action 440). For each track section, the track section's altitude can be assigned to the floor level(s) whose horizontal geometry matches or match best with the horizontal shape of the track section (such as action 450).

Figure 5:
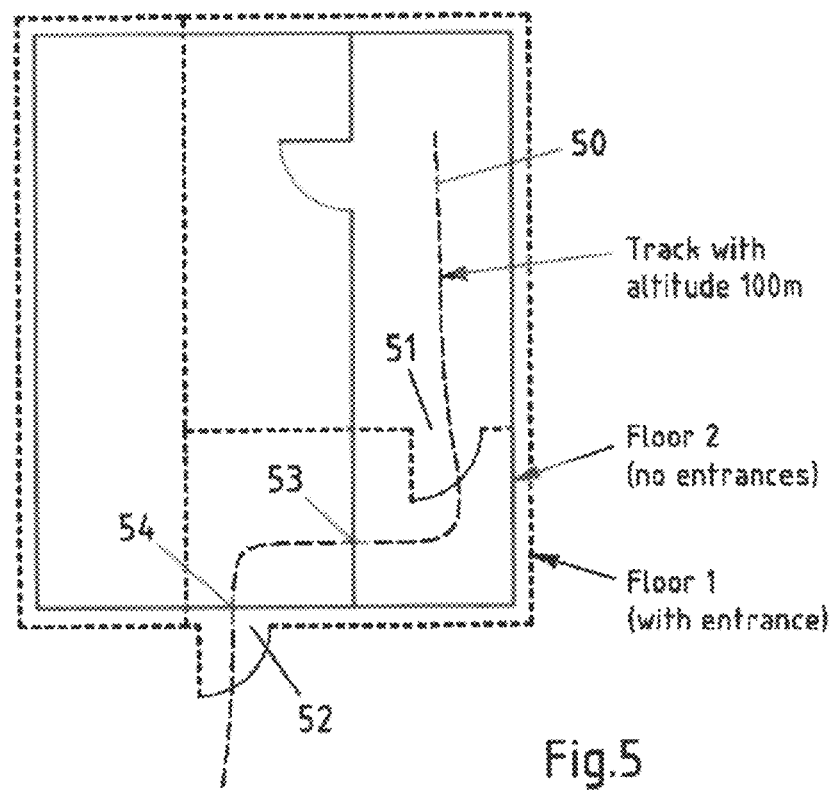
FIG. 5 is an exemplary illustration of a track section and two floors represented by indoor map data.

FIG. 5 illustrates this idea: the horizontal shape of a track section 50 matches well with the horizontal geometry of only floor 1 (dotted lines). The track goes inside the boundary of both floor 1 and floor 2 (solid lines). The track section passes the doors 51, 52 of floor 1. The track section passes the perimeter of floor 2 without a door at points 53, 54. The user cannot be in floor 2 because the horizontal shape of the track intersects the floor perimeter, but there are no corresponding entrances. Thus, Floor 1 can be considered more probable. Therefore, the altitude of floor 1 should be the altitude of the track section, i.e. 100 m in this case. This is, however, only a very basic case, where an unambiguous floor altitude determination can be done. For a single track section, the assignment to a specific floor level in general cannot be done unambiguously.

For example, if only the entrance information is used, there can be entrances that are in different floors but whose horizontal coordinates are practically identical. Furthermore, different floors of the same building can cover different horizontal areas and have different geometrical shapes. Thereby, it cannot always be known whether the user was in one floor and used an entrance, or whether the user was at another floor where the track's horizontal shape does not intersect with the floor boundary or perimeter (i.e. the track is totally enclosed inside the floor boundary or is fully outside of the floor boundary). For example, the track section 60 shown in FIG. 6a may either lead through the entrance 61 on floor 1 (dotted line) or may be at the altitude of floor 3 (partly dashed line), i.e. actually not inside floor 3, but at the same altitude. In contrast, track section 60 cannot be in floor 2 (solid line), because the track intersects with the perimeter of floor 2, while the perimeter does not have any entrances. Because of these ambiguities, each track section can be assigned to multiple floor levels with different weights, and the eventual matching of floor index and absolute altitude can be made using statistical inference methods.

Especially when only reduced indoor map data is used, some further assumptions might have to be made. For example, one might have to assume that the ordering of the floors is known, i.e. that e.g. floor 2 is higher in altitude than floor 1, for example. Furthermore, assumptions of the floor heights may need to be made. These assumptions might include one or more of the following:

1. The floor heights are assumed to be known precisely or approximately.
2. Constant floor height is assumed for a structure.
3. A set of floor altitudes is known based on e.g. methods for detecting multi-floor areas and their floor altitudes from crowdsourced data, but it is not known which floor indices the floor altitudes correspond to.

Thus, in the following a more advanced method exploiting statistical methods in order to eliminate ambiguities is described in more detail. For the following exemplary implementation, it is assumed that the boundary or outer perimeter of each floor is known and described as a polygon ("floor polygon"), that the location of each entrance is known in (latitude, longitude, floor index) coordinates, and that the ordering of the floors is known, i.e. the floor altitude is an increasing function of the floor index. Furthermore, it is assumed that the floor height h is constant and is chosen from a finite set of candidate values, e.g. A={3.5 m, 3.6 m, 3.7 m, . . . , 4.5 m,}. However, these assumptions must not necessarily be made for the invention and the following implementation to work.

In short, the example method comprises the following actions:

1. Divide each track into short track sections.
2. Pick the track sections that contain the most relevant information.
3. For each picked track section, determine probabilities for the track section being in each floor level based on how well the track section matches with the horizontal geometry of the floor.
4. For each floor and each track section, compute the likelihood function of the floor altitude (the higher the probability computed at point 3, the more the floor's likelihood is concentrated close to the track section's altitude).
5. For each floor, compute the altitude probability distribution as a product of individual track sections' likelihoods.
6. Compute the probability of each set of floor altitude values.
7. Choose the most probable floor altitude values.

Figure 6A:
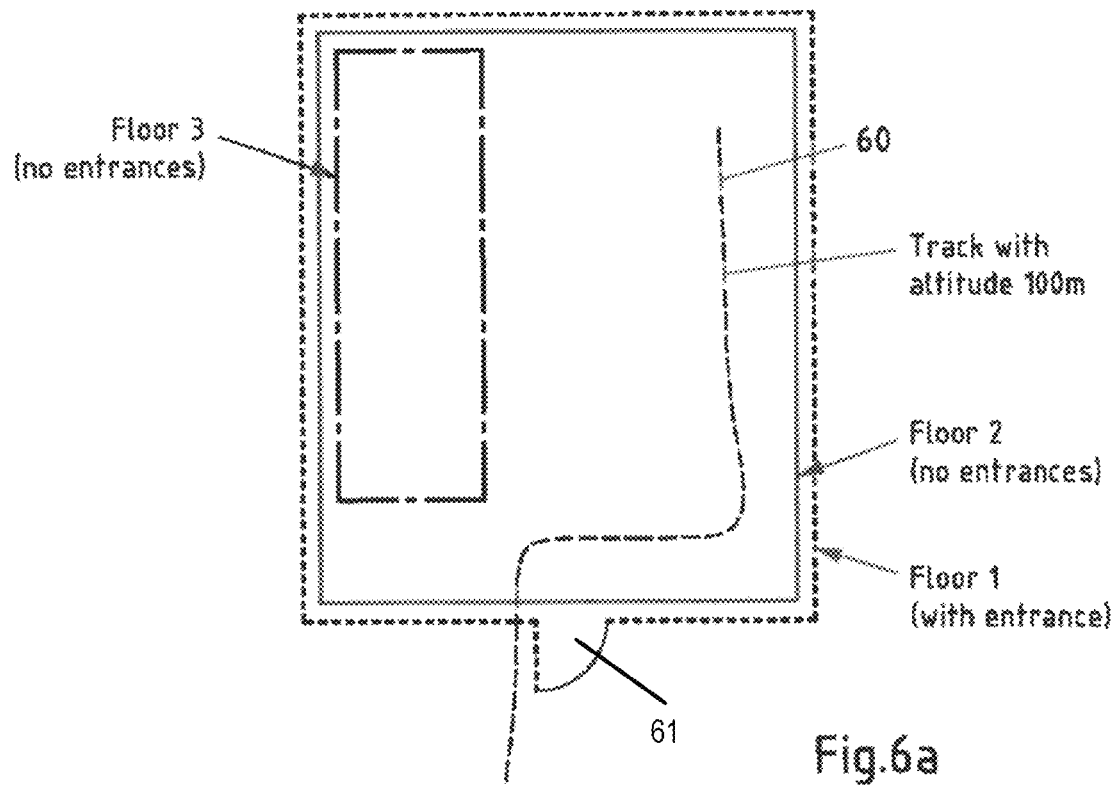
FIG. 6a is an exemplary illustration of a track section and three floors represented by indoor map data.

This approach will now be described in more detail with regard to FIGS. 4, 6 and 7.

Returning to FIG. 4, according to action 410, location data representing at least one track of one or more users at least partially in a structure is obtained. The location data comprises horizontal location information and vertical location information, wherein the vertical location information is representative of an absolute altitude.

According to action 420, indoor map data is also obtained representing different floors of the structure and indicating structural elements on the different floors. The indoor map data may for instance represent a different floors and entrances, for instance floor 1 (dotted line), floor 2 (solid line) and floor 3 (partly dashed line) and entrance 61 as shown FIG. 6*a*.

Track sections of the at least one track represented by the location data are determined such that each track section can be assumed to be on a single floor of the structure (action 430). An example of a track section 60 is shown in FIG. 6*a*.

For instance, each track is divided into short track sections with e.g. 5-second intervals. It is assumed that location at the ending point of each ith track section has a 3D reference location in (latitude $lat_i$, longitude $lon_i$, altitude $alt_i$) coordinates and uncertainty values $\sigma_{horiz\,i}$ and $\sigma_{alt\,i}$ for horizontal position and altitude (e.g. standard deviations).

From the track sections only those are selected that contain the most relevant information about the floor altitudes. Preferably, a minimum number of track sections is selected in order to reduce processing load and number of correlated measurements. This can be achieved by selecting the track sections where the track intersects with any floor polygon edge, and additional track sections such that all the altitude bands (e.g. 100 m+/−1 m, 103.5 m+/−1 m, etc.) observed during the track become picked up. For example, the track sections are picked where the track intersects any floor polygon edge. Also, each track section is picked where the altitude difference from any previously picked track section is significant (e.g. at least one floor level, say, 3.5 meters).

The determined track sections are at least partially compared with floors of the structure represented by the indoor map data (action 440). This comparing comprises a determining, for at least some combinations of track sections and floors, a weighting factor indicating the matching of a respective track section to a respective floor (action 441).

More specifically, for each selected track section, a weight is determined for each floor level based on how well the track section matches with the horizontal geometry of the floor. The total number of weights is "floor count" times "selected track section count"). For example, the following algorithm is used to give the highest weights to the floors where the track section intersects with the floor polygon edge close to an entrance:

For each floor f where the ith track section intersects with the floor boundary, the distance $d_{f,i,e}$ from the intersection point to each entrance e located in the floor is computed (if there are any entrances in the floor). Compute the weight $\hat{W}_{f,i}$ with a formula that is a decreasing function of each distance $d_{f,i,e}$. For example, the Gaussian function is recommendable:

$$\hat{W}_{f,i} = \begin{cases} \sum_e \dfrac{1}{\sqrt{\sigma_{horiz_i}^2 + p_1^2}} \exp\left(-\dfrac{1}{2}\dfrac{d_{f,i,e}^2}{\sigma_{horiz_i}^2 + p_1^2}\right), & \text{if there is at least one entrance in floor } f \\ 0, & \text{otherwise} \end{cases}$$

where $\sqrt{}$ denotes the square-root, $\Sigma_e$ denotes the sum over the entrance indices e, exp( ) is the exponential function, $p_1$ is a parameter that describes the typical entrance width, e.g. $p_1$=1 meter, and $\sigma_{horiz\,i}$ is the horizontal location's standard deviation, in particular at the point of intersection of the track section with the floor boundary. Based on this formula, a floor where the track section intersects the floor boundary close to an entrance gets a high weight.

For each floor f where the ith track section does not intersect with the floor boundary, the weight $\hat{W}_{f,i}$ can be a constant. This constant can be smaller than the weight of a combination of track section and floor where the track section intersects the floor boundary with a small distance $d_{f,i,e}$ and otherwise larger. For example, the following function is recommendable:

$$\tilde{W}_{f,i} = \frac{1}{\sqrt{\sigma_{horiz_i}^2 + p_2^2}}$$

where $p_2$ is parameter that is larger than $p_1$ e.g. $p_2=100$ meters. This weight accounts for the possibility that the user did not actually use any entrance.

The availability of GNSS positioning can be used as a further measurement of whether the user entered or exited a structure or was all the time inside the structure. This measurement can be used e.g. using the following rules:

i. If GNSS is regularly available both before and after the track section, increase the weights of the floors where the track section is completely outside the floor polygon.
ii. If GNSS becomes available during the track section, increase the probability numbers of the floors where the track section exits the floor polygon.
iii. If GNSS stops being available during the track section, increase the probability numbers of the floors where the track section enters the floor polygon.
iv. If GNSS is not available either before or after the track section, increase the probability numbers of the floors where the track section is completely inside the floor polygon.

Based on said comparing (i.e. on the computed weights or weighting factors), an absolute altitude of at least some of the floors of the structure represented by the indoor map data can be determined (action 450).

This comprises computing, for at least some combinations of track sections and floors, a likelihood function indicating the likelihood of the absolute altitude of a respective floor based on a respective track section (action 451).

For each floor f and track section i, the likelihood function of the floor altitude alt is computed such that the higher the weight, the more the likelihood is concentrated close to the track section's altitude $alt_i$. A recommendable formula for the likelihood function (which can be thought of as a kind of unnormalized probability density function) is based on a mixture distribution, e.g.

$$\ell_{f,i}(alt) = \mathbb{P}_{f,i} \cdot \frac{1}{\sqrt{2\pi \sigma_{alt_i}^2}} \exp\left(-\frac{1}{2}\frac{(alt-alt_i)^2}{\sigma_{alt_i}^2}\right) +$$

$$(1-\mathbb{P}_{f,i}) \cdot \left(1 - \exp\left(-\frac{1}{2}\frac{(alt-alt_i)^2}{\sigma_{alt_i}^2}\right)\right) \cdot C_i$$

where $\mathbb{P}_{f,i}$ is the (normalized) probability of floor f, which may be defined with the weighting factors $\hat{W}_{f,i}$ as $$\mathbb{P}_{f,i} = \frac{\tilde{W}_{f,i}}{\sum_g \tilde{W}_{g,i}}$$

and $C_i$ is a constant number that ensures integrability to one, e.g.

$$C_i = \left(\eta - \sqrt{2\pi}\sigma_{alt_i} \cdot \left(\Phi\left(\frac{0.5\eta}{\sigma_{alt_i}}\right) - \Phi\left(-\frac{0.5\eta}{\sigma_{alt_i}}\right)\right)\right)^{-1},$$

where n is an approximate building altitude e.g. η=[number of floors]×floor height (e.g. 3.5 meters) and Φ is the cumulative distribution function of the standard normal distribution (this formulation ensures that the latter term integrates to $(1-\mathbb{P}_{f,i})$). The first term of this mixture distribution covers the case that the track section is (likely) in floor f so floor f's altitude is close to $alt_i$, and the latter term covers the case that the track section is in any other floor, so floor f's altitude can be anything but close to $alt_i$.

Figure 6B:
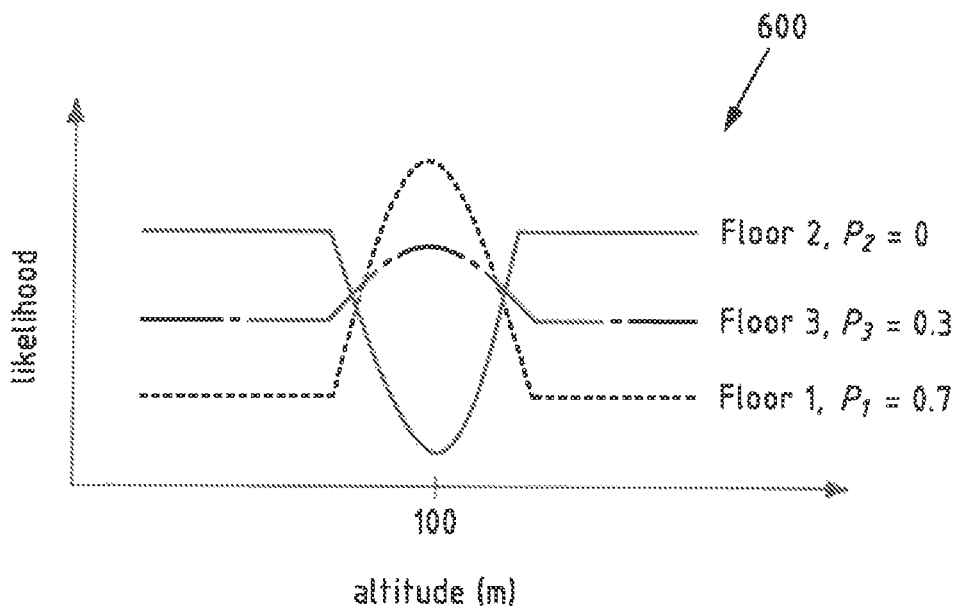
Figure 7:
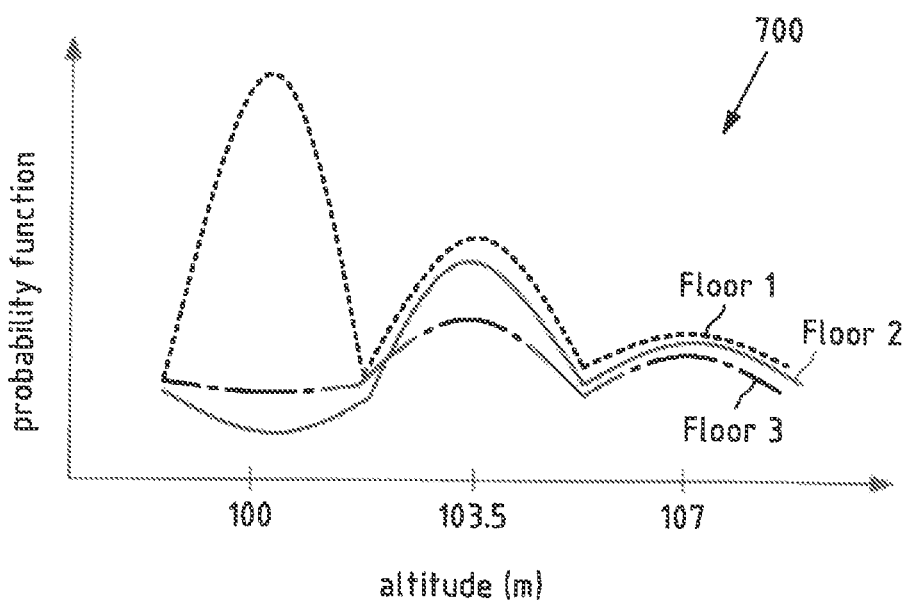
FIG. 7 provides exemplary illustrations of probability functions for different floors.

FIG. 6b exemplifies such likelihood functions in the example scenario of FIG. 6a with a diagram 600. In this example, the track section intersects with the perimeters of floor 1 and floor 2. Floor 1's altitude likelihood $l_{f,i}$ (dotted line) is highly concentrated around 100 m, because there is an entrance quite close to the intersection point, while the likelihood function $l_{f,i}$ of floor 2 (solid line) gets most weight far from 100 m because the track crosses floor 2's wall, leading to an improbable scenario. the likelihood function $l_{f,i}$ of floor 3 (partly dashed line) also gets a quite concentrated likelihood around an altitude of 100 m, because the track section does not intersect with the perimeter of floor 3 and would thus be generally possible at or compatible with floor 3. Also indicated are the normalized probabilities $\mathbb{P}_{f,i}$ of the different floors f with respect to the same track section i (track section 60 in FIG. 6a): $\mathbb{P}_{1,i}=0.7$, $\mathbb{P}_{2,i}=0$, $\mathbb{P}_{3,i}=0.3$.

The determining of an absolute altitude of at least some of the floors of the structure represented by the indoor map data further comprises computing, for at least some floors, an altitude probability function indicating the probabilities of absolute altitudes of a respective floor (action 452).

Next, the likelihood functions of all the track sections are combined to get a (possibly unnormalized) probability density function for each floor's absolute altitude. One option to combine the likelihood functions is $l_{f,i}$ to multiply them according to the rules of probability:

$$\tilde{p}_f(alt) = \prod_i \ell_{f,i}(alt)$$

where $\Pi_i$ denotes the product over all the track sections. Therein, for each floor, the likelihood functions have been evaluated for each selected track section only at e.g. the points of a regular altitude grid such as {smallest measured altitude (sma), sma+1 m, sma+2 m, . . . , largest measured altitude} and then combined in order to reduce computational complexity. FIG. 7 shows a diagram 700 of exemplary illustrations of probability functions $p_f$ for different floors. In this case, the given example algorithm will give the floor altitude 100 m for floor 1, 103.5 m for floor 2, and 107 m for floor 3. While floor 3 actually has more probability around 103.5 m than for 107 m, it assumed to be known that floor 3 is above floor 2, so 107 m is a more probable value for floor 3 in joint probability.

The determining of an absolute altitude of at least some of the floors of the structure represented by the indoor map data further comprises computing probability values for different sets of potential absolute altitudes of at least some of the floors of the structure (action 453).

For this, it is looped over each possible combination of absolute floor altitudes and a probability number is evaluated for each combination. For example, a (possibly unnormalized) probability for each floor height candidate $h_j$ is obtained and each 1st floor altitude candidate $alt1_k$ is obtained e.g. with the formula $$\tilde{p}(alt1_k, h_j) = \Pi_f \tilde{p}_f(alt1_k + (f-1) \cdot h_j),$$

where $\Pi_f$ denotes the product over all floors.

Further, the determining of an absolute altitude of at least some of the floors of the structure represented by the indoor map data further comprises choosing absolute altitudes for at least some of the floors of the structure such that the probability value is maximized (action 454).

For this, the floor altitude combination, i.e. the floor absolute altitude and the floor height, is chosen that best explains the measurements. For example, choose the ($alt1_k$, $h_j$) that maximizes the value of the probability $p(alt1_k, h_j)$.

It is noted that action 453 can be modified if constant floor height is not assumed. For example, it may be that some floor altitudes have been estimated with a multi-floor detection method but have not been matched with the floor indices. The probability number can then be computed for each possible combination of the detected absolute altitude/floor index-matching and a prior value for the remaining floor levels.

The proposed algorithm can be extended such that all boundaries and entrances (e.g. wall intersections and doors) also inside the floors are taken into account.

Figure 8:
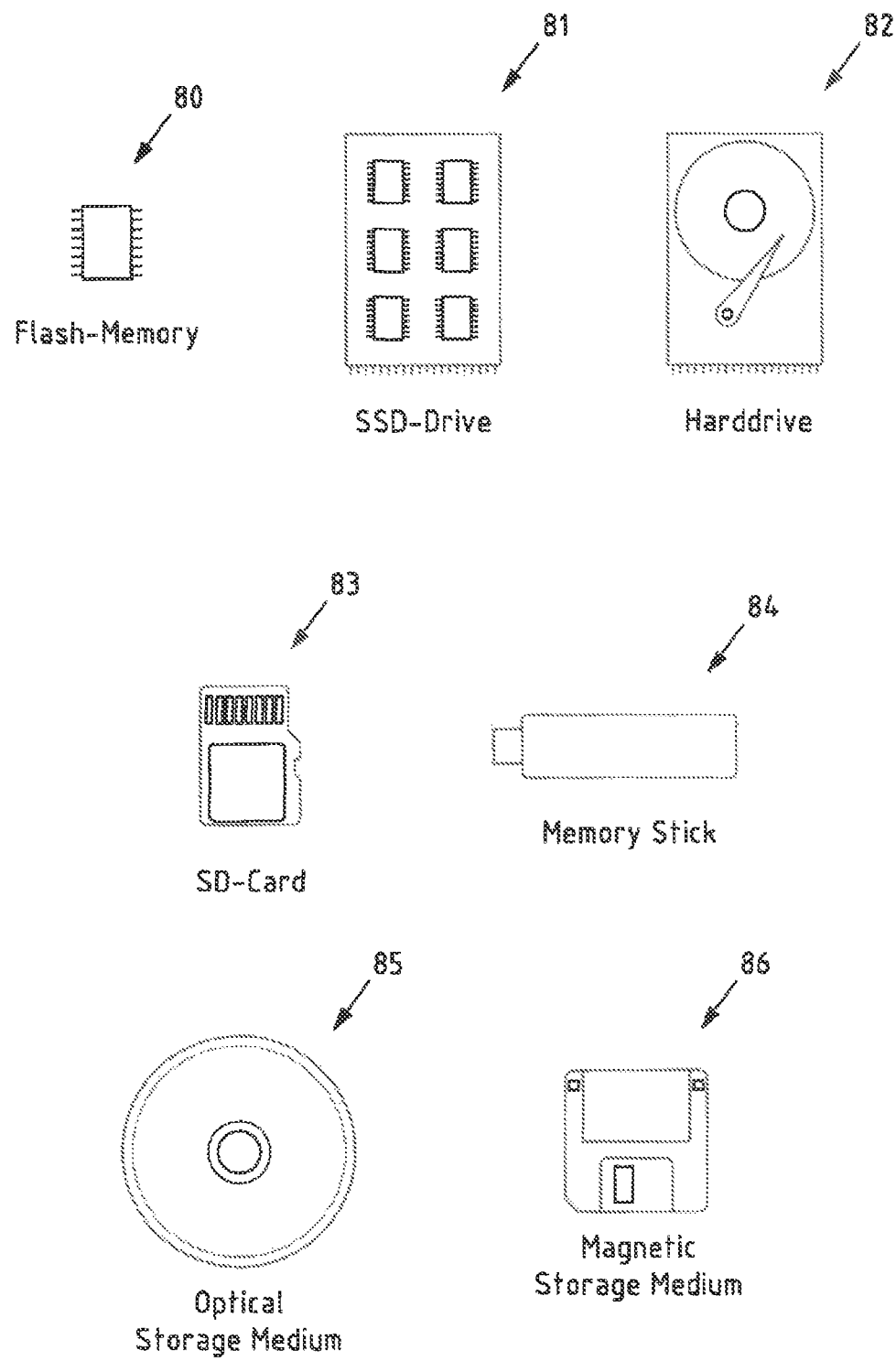
FIG. 8 is a schematic illustration of examples of tangible storage media according to the invention.

FIG. 8 is a schematic illustration of examples of tangible storage media according to the present invention, that may for instance be used to implement the program memories described of FIG. 2 or 3. To this end, FIG. 8 displays a flash memory 80, which may for instance be soldered or bonded to a printed circuit board, a solid-state drive 81 comprising a plurality of memory chips (e.g. Flash memory chips), a magnetic hard drive 82, a Secure Digital (SD) card 83, a Universal Serial Bus (USB) memory stick 84, an optical storage medium 85 (such as for instance a CD-ROM or DVD) and a magnetic storage medium 86.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors of FIGS. 2 and 3, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed is:

1. A method performed by at least one apparatus, the method comprising:
   obtaining location data representing at least one track of one or more users at least partially in a structure, said location data comprising horizontal location information and vertical location information, said vertical location information being representative of an absolute altitude;
   obtaining indoor map data representing different floors of the structure and indicating structural elements on the different floors;
   determining track sections of the at least one track represented by the location data such that each track section can be assumed to be on a single floor of the structure;
   at least partially comparing determined track sections with floors of the structure represented by the indoor map data; and
   determining, based on said comparing, an absolute altitude of at least some of the floors of the structure represented by the indoor map data, wherein said determining of an absolute altitude of at least some of the floors comprises determining, for at least some of the floors, an altitude probability function indicating probabilities of absolute altitudes of a respective floor.

2. The method of claim 1, further comprising:
   transforming, based on said determined absolute altitude of at least some of the floors of the structure, vertical location information representative of an absolute altitude into vertical location information representative of a floor of the structure or vertical location information representative of a floor of the structure into vertical location information representative of an absolute altitude.

3. The method of claim 1, wherein said location data is crowdsourcing data obtained by a plurality of users in a crowdsourcing process.

4. The method of claim 1, wherein said vertical location information is based on one or more of the following:

signals of a global navigation satellite system observed at a device of a respective user;
signals of a cellular communication system observed at a device of a respective user;
signals a non-cellular communication system observed at a device of a respective user;
a barometer of a device of a respective user;
a motion sensor of a device of a respective user;
an accelerometer of a device of a respective user;
a magnetometer of a device of a respective user;
a gyroscope of a device of a respective user;
an altitude map; and/or
a manual user input of a respective user.

5. The method of claim 1, wherein said method further comprises:
selecting, from the determined track sections, track sections to be used for said comparing determined track sections with floors of the structure represented by the indoor map data.

6. The method of claim 5, wherein said selecting of track sections to be used for said comparing comprises selecting at least some or all of the track sections intersecting with a floor boundary indicated by the indoor map data and/or selecting track sections such that altitudes associated with the track sections substantially cover the whole altitude range of the track.

7. The method of claim 1, wherein said comparing comprises:
determining, for at least some combinations of track sections and floors, a weighting factor indicating a matching of a respective track section to a respective floor.

8. The method of claim 7, wherein said determining of a weighting factor is based on the matching of the horizontal location information of the respective track section with a horizontal geometry of the respective floor.

9. The method of claim 7, wherein
in case a respective track section intersects with a floor boundary of the respective floor indicated by the indoor map data, the weighting factor is determined such that the closer to an entrance of the respective floor the respective track section intersects with a floor boundary of the respective floor the higher the weighting factor; and/or
in case a respective track section intersects with a floor boundary of the respective floor indicated by the indoor map data and there is no entrance in that respective floor, the weighting factor is set to a predetermined value; and/or
in case a respective track section does not intersect with a floor boundary of the respective floor indicated by the indoor map data, the weighting factor is set to a predetermined value.

10. The method of claim 7, wherein the determination of the weighting factor is influenced by a determination, based on the location data, of whether a respective user was completely inside the structure, completely outside the structure or switched between inside the structure and outside the structure.

11. The method of claim 1, wherein said determining of an absolute altitude of at least some of the floors comprises:
computing, for at least some combinations of track sections and floors, a likelihood function indicating the likelihood of the absolute altitude of a respective floor based on a respective track section.

12. The method of claim 11, wherein said likelihood function is based on a mixture distribution.

13. The method of claim 11, wherein said computing of a respective altitude probability function is based on the computed likelihood function of the respective floor.

14. The method of claim 1, wherein said determining of an absolute altitude of at least some of the floors comprises:
computing probability values for different sets of potential absolute altitudes of at least some of the floors of the structure.

15. The method of claim 14, wherein a respective probability value is based on values of the altitude probability functions for the respective floors being at respective absolute altitudes.

16. The method of claim 15, wherein said determining of an absolute altitude of at least some of the floors comprises:
choosing absolute altitudes for at least some of the floors of the structure such that the probability value is maximized.

17. The method of claim 1, wherein the method further comprises:
using said determined absolute altitude of at least some of the floors of the structure for representing vertical location information representative of an absolute altitude with respect to floors represented by an indoor map.

18. An apparatus comprising at least one processor and at least one memory containing computer program code, the at least one memory and the computer program code configured, with the at least one processor, to cause the apparatus at least to:
obtain location data representing at least one track of one or more users at least partially in a structure, said location data comprising horizontal location information and vertical location information, said vertical location information being representative of an absolute altitude;
obtain indoor map data representing different floors of the structure and indicating structural elements on the different floors;
determine track sections of the at least one track represented by the location data such that each track section can be assumed to be on a single floor of the structure;
at least partially compare determined track sections with floors of the structure represented by the indoor map data; and
determine, based on said comparing, an absolute altitude of at least some of the floors of the structure represented by the indoor map data, wherein said determining of an absolute altitude of at least some of the floors comprises determining, for at least some of the floors, an altitude probability function indicating probabilities of absolute altitudes of a respective floor.

19. A non-transitory computer readable storage medium storing computer program code, the computer program code, when executed by a processor, causing at least one apparatus to:
obtain location data representing at least one track of one or more users at least partially in a structure, said location data comprising horizontal location information and vertical location information, said vertical location information being representative of an absolute altitude;
obtain indoor map data representing different floors of the structure and indicating structural elements on the different floors;
determine track sections of the at least one track represented by the location data such that each track section can be assumed to be on a single floor of the structure;

at least partially compare determined track sections with floors of the structure represented by the indoor map data; and determine, based on said comparing, an absolute altitude of at least some of the floors of the structure represented by the indoor map data, wherein said determining of an absolute altitude of at least some of the floors comprises determining, for at least some of the floors, an altitude probability function indicating probabilities of absolute altitudes of a respective floor.

* * * * *